(12) United States Patent
Cantin (10) Patent No.: US 7,843,458 B2
(45) Date of Patent: Nov. 30, 2010

(54) GRAPHICS PROCESSOR WITH INTEGRATED WIRELESS CIRCUIT

(75) Inventor: Pierre-Luc Cantin, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 232 days.

(21) Appl. No.: 12/123,082

(22) Filed: May 19, 2008

(65) Prior Publication Data

US 2008/0211818 A1 Sep. 4, 2008

Related U.S. Application Data

(62) Division of application No. 11/016,007, filed on Dec. 17, 2004, now abandoned.

(51) Int. Cl.
*G06F 13/14* (2006.01)
*H04K 1/10* (2006.01)
*H04L 27/28* (2006.01)

(52) U.S. Cl. .................. 345/520; 375/260; 345/519
(58) Field of Classification Search .......... 345/520, 345/502, 519; 375/260
See application file for complete search history.

(56) References Cited

U.S. PATENT DOCUMENTS

| | | | |
|---|---|---|---|
| 5,648,969 A | 7/1997 | Pasternak et al. | |
| 6,101,213 A | 8/2000 | Van Allen | |
| 6,263,413 B1 | 7/2001 | Motomura et al. | |
| 6,765,599 B2 | 7/2004 | Nagai et al. | |
| 7,053,863 B2 | 5/2006 | Glen et al. | |
| 7,657,913 B2 * | 2/2010 | Pedlow, Jr. ................ | 725/95 |
| 2003/0025648 A1 | 2/2003 | Glen et al. | |
| 2003/0027517 A1 | 2/2003 | Callaway et al. | |
| 2004/0044725 A1 | 3/2004 | Bell et al. | |
| 2004/0230997 A1 | 11/2004 | Kaylani | |
| 2006/0028399 A1 | 2/2006 | Glen et al. | |

FOREIGN PATENT DOCUMENTS

| | | |
|---|---|---|
| JP | 05-130423 A | 5/1993 |
| JP | 09-064882 A | 3/1997 |
| JP | 10-171766 A | 6/1998 |
| KR | 1998-81843 | 4/1998 |
| KR | 2002-16322 | 8/2000 |

OTHER PUBLICATIONS

Korean Office Action mailed Jul. 10, 2008, for the corresponding related Korean Publication No. 10-2007-7016347, filed Jul. 16, 2007.

International Search Report mailed Nov. 22, 2006 for the corresponding related International Application No. PCT/US05/41695, filed Nov. 16, 2005.

* cited by examiner

*Primary Examiner*—Ryan R Yang
(74) *Attorney, Agent, or Firm*—Townsend and Townsend and Crew LLP (57) ABSTRACT

Circuits, methods, and apparatus that are capable of processing graphics information and wirelessly transmitting processed graphics information to a monitor. In order to achieve a high bandwidth, one embodiment of the present invention provides a graphics processor chip that includes multiple RF transmitters such that processed graphics information can be transmitted using the cumulative bandwidth of multiple wireless channels. These transmitters can use one or more RF standards or proprietary signaling schemes.

20 Claims, 10 Drawing Sheets

GRAPHICS PROCESSOR WITH INTEGRATED WIRELESS CIRCUIT

CROSS-REFERENCE TO RELATED APPLICATIONS

This application is a divisional of U.S. patent application Ser. No. 11/016,017, filed Dec. 17, 2004, which is incorporated by reference.

BACKGROUND

The present invention relates to integrated circuits including both graphics processing and wireless circuitry.

At present, the digital media landscape is a scattered and fractured one. The home office realm of computers, the Internet, and high-resolution LCD monitors is balkanized from that of the home entertainment territory including televisions, video recorders, and set-top boxes. For example, a computer and its DVD player and high-resolution LCD monitor may sit idle in a home office while television programs are viewed on a low-resolution CRT monitor in the living room.

One solution to harmonize these products has been to encourage the migration of the personal computer to the living room, where by its proximity, it may become more useful as a home entertainment device. But not everyone enjoys the personal computer in such a public place, the bedroom, den, or home office seems to be preferred.

Because of this, new, high-resolution monitors such as plasma and LCD televisions are cut off from the Internet and computer peripherals such as DVD read/write drives.

Manufacturing monitors having wireless connections is one solution to bridging this gap. However, conventional wireless techniques lack the bandwidth and data transfer rates necessary to provide a superior quality image, particularly for high-resolution monitors.

Thus, what are needed are circuits, methods, and apparatus that provide high bandwidth wireless connections that support the transmission of high quality images to wireless monitors.

SUMMARY

Accordingly, embodiments of the present invention provide circuits, methods, and apparatus that are capable of processing graphics information and wirelessly transmitting this processed graphics information to a monitor. In order to achieve a high bandwidth, one embodiment of the present invention provides a graphics processor integrated circuit that incorporates multiple RF transmitters such that processed graphics information can be transmitted using the cumulative bandwidth of multiple wireless channels. In various embodiments, these transmitters can use one or more RF standards or proprietary signaling schemes. Embodiments of the present invention may incorporate one or more of these or the other features described herein.

An exemplary embodiment of the present invention provides an integrated circuit. This integrated circuit includes a graphics processing circuit configured to receive graphics information, generate processed graphics information, and provide the processed graphics information in at least a first portion and a second portion, a first wireless transmitter coupled to the graphics processing circuit and configured to receive the first portion of the processed graphics information and transmit the first portion of the processed graphics information, and a second wireless transmitter coupled to the graphics processing circuit and configured to receive the second portion of the processed graphics information and transmit the second portion of the processed graphics information.

Another exemplary embodiment of the present invention provides a method of processing and transmitting graphics information. This method includes receiving graphics information using a graphics processor on an integrated circuit, processing the graphics information using the graphics processor, dividing the processed graphics information into at least a first portion and a second portion, transmitting the first portion of the processed graphics information as a first RF signal, and transmitting the second portion of the processed graphics information as a second RF signal.

A further exemplary embodiment of the present invention provides a computer system. This computer system provides a first integrated circuit including a graphics processing circuit configured to receive graphics information, generate processed graphics information, and provide the processed graphics information as at least a first portion and a second portion, a first wireless transmitter coupled to the graphics processing circuit and configured to receive the first portion of the processed graphics information and transmit the first portion of the processed graphics information as a first RF signal, and a second wireless transmitter coupled to the graphics processing circuit and configured to receive the second portion of the processed graphics information and transmit the second portion of the processed graphics information as a second RF signal.

This exemplary system further includes a second integrated circuit including a first wireless receiver configured to receive the first RF signal and provide the first portion of the processed graphics information, a second wireless receiver configured to receive the second RF signal and provide the second portion of the processed graphics information, and an output circuit configured to receive the first and second portions of the processed graphics information and provide a first output.

A still further embodiment of the present invention provides another integrated circuit. This integrated circuit includes a graphics processing unit coupled to a graphics memory interface, a packet generator circuit coupled to the graphics memory interface, an encapsulator coupled to the packet generator, a demultiplexer coupled to the encapsulator, a first wireless transmitter coupled to the demultiplexer, and a second wireless transmitter coupled to the demultiplexer.

Yet a further embodiment of the present invention provides another computer system. This computer system includes a first integrated circuit that includes a graphics processing unit, a first transceiver coupled to the graphics processing unit, and a second transceiver coupled to the graphics processing unit. This system further includes a second integrated circuit that includes a third transceiver, a fourth transceiver, and an output circuit coupled to the first and second transceivers. The first and second transceivers are configured to transmit first status information and first graphics information.

A better understanding of the nature and advantages of the present invention may be gained with reference to the following detailed description and the accompanying drawings.

DESCRIPTION OF EXEMPLARY EMBODIMENTS

Figure 1:
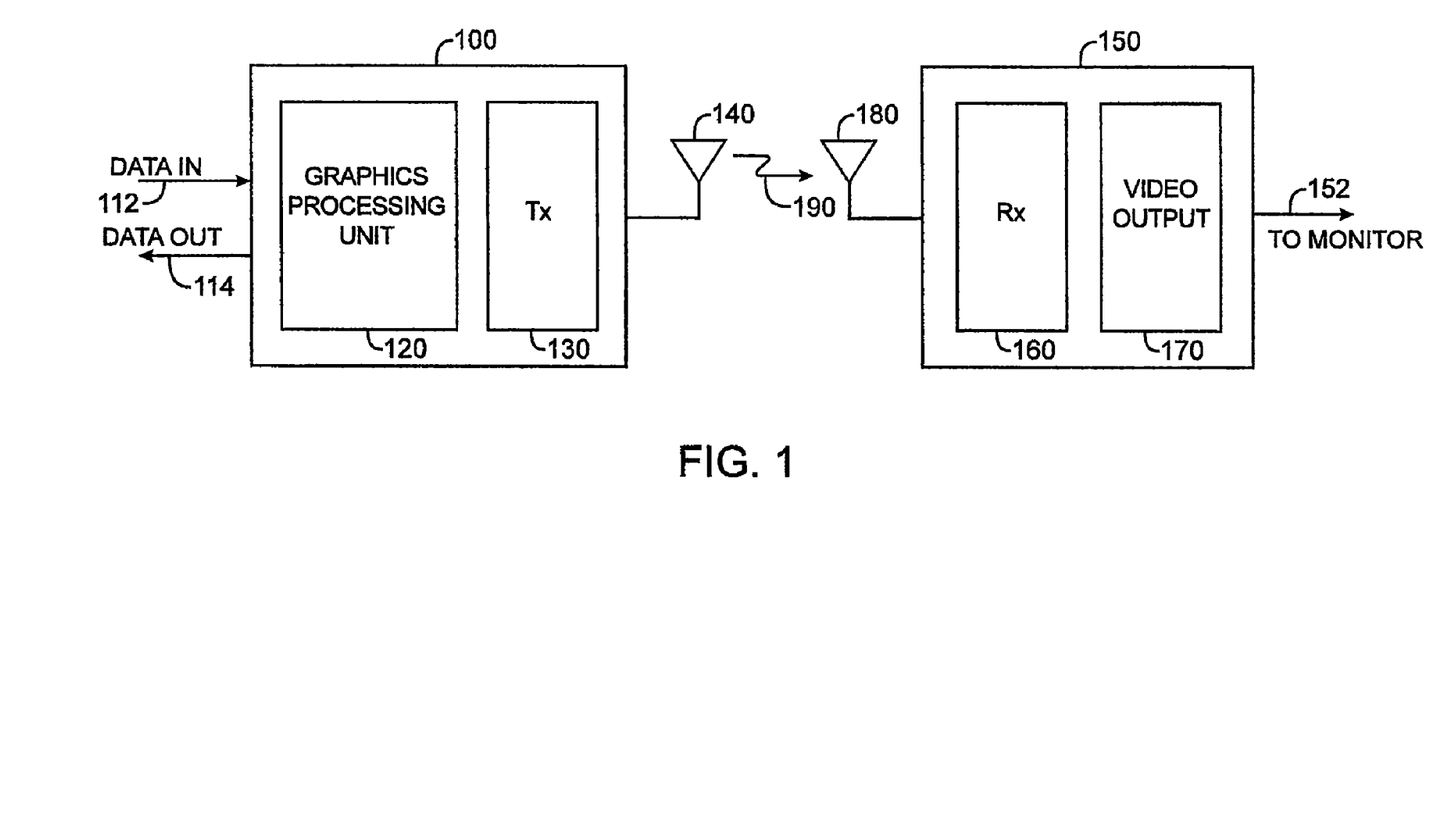
FIG. 1 is a block diagram of a wireless graphics system according to an embodiment of the present invention.

FIG. 1 is a block diagram of a wireless graphics system according to an embodiment of the present invention. This block diagram includes a first integrated circuit 100 and a second integrated circuit 150. The first integrated circuit includes a graphics processing unit 120 and a wireless transmitter 130. The graphics processing unit 120 receives data on lines 112 and provides data out on lines 114. Typically, these connections are to a central processing or other computing system or subsystem. The wireless transmitter 130 transmits signals over antenna 140 through wireless channel 190 to antenna 180.

The second integrated circuit 150 includes a receiver 160 and a video output circuit 170. Signals appearing on antenna 180 are received by receiver 160. The second integrated circuit provides a video signal on line 152 to a monitor or other display apparatus.

With this configuration, a graphics processing unit may be located in one room, for example a home office, as part of a computing system, while the second integrated circuit 150 acts a receiver for a wireless monitor in a second room, for example a living room. In this way, the computing power of a computer or central processing unit can be harnessed without needing a cable or other conductor as a connection.

Figure 2:
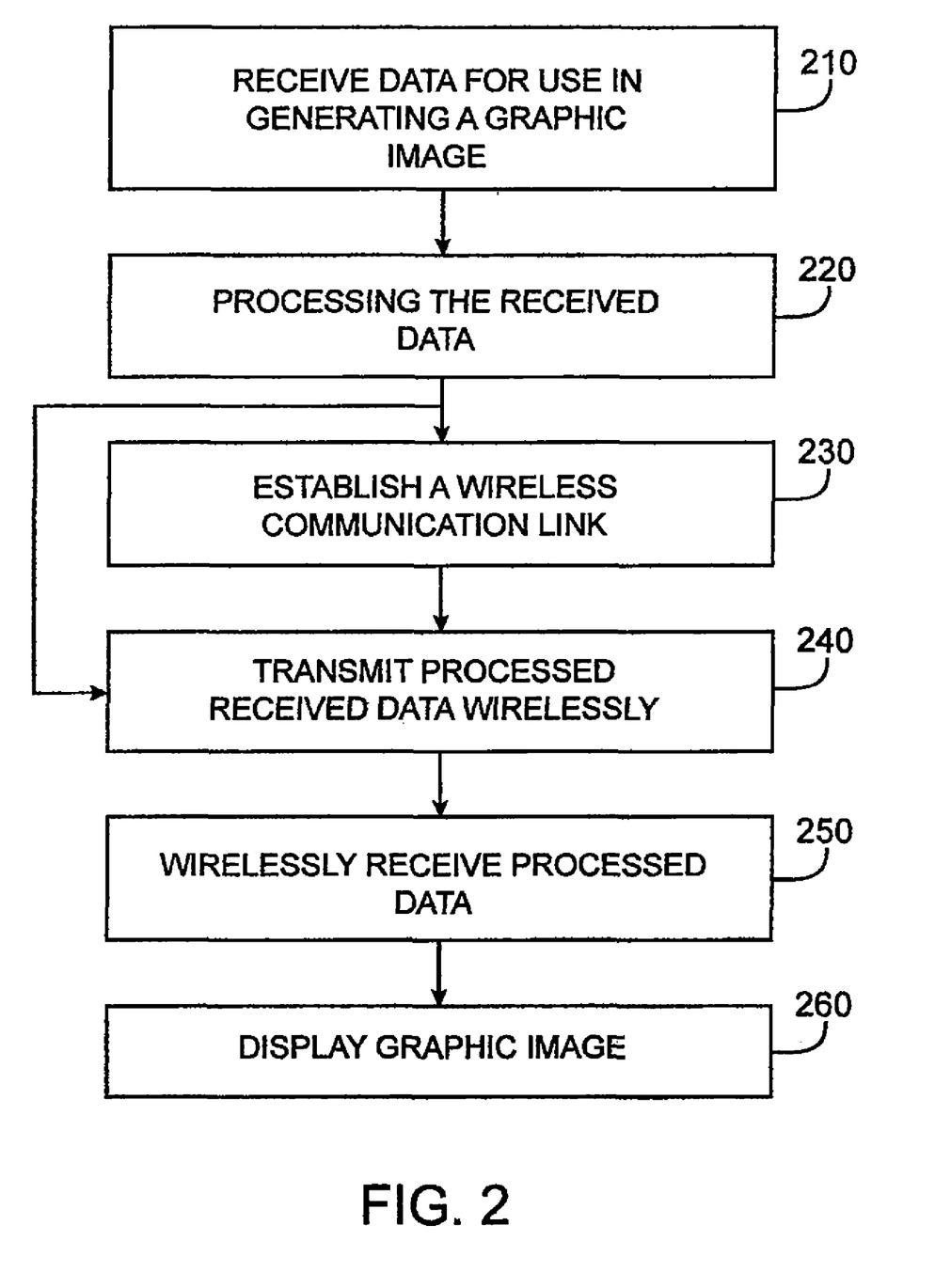
FIG. 2 is a flowchart illustrating the operation of a wireless graphic system according to an embodiment of the present invention.

FIG. 2 is a flowchart illustrating the operation of a wireless graphic system according to an embodiment of the present invention. In act 210, data for use in generating a graphics image is received. This data may be provided by a CPU or other computing device and received by a graphics processing unit. In act 220, the received data is processed by the graphics processing unit.

In act 230, a wireless communication link is established. The processed data is modulated up in frequency and then transmitted wirelessly in act 240. In act 250, the processed data is received using a wireless receiver and then demodulated. The demodulated processed data is then used to display a graphic image in act 260.

Figure 3:
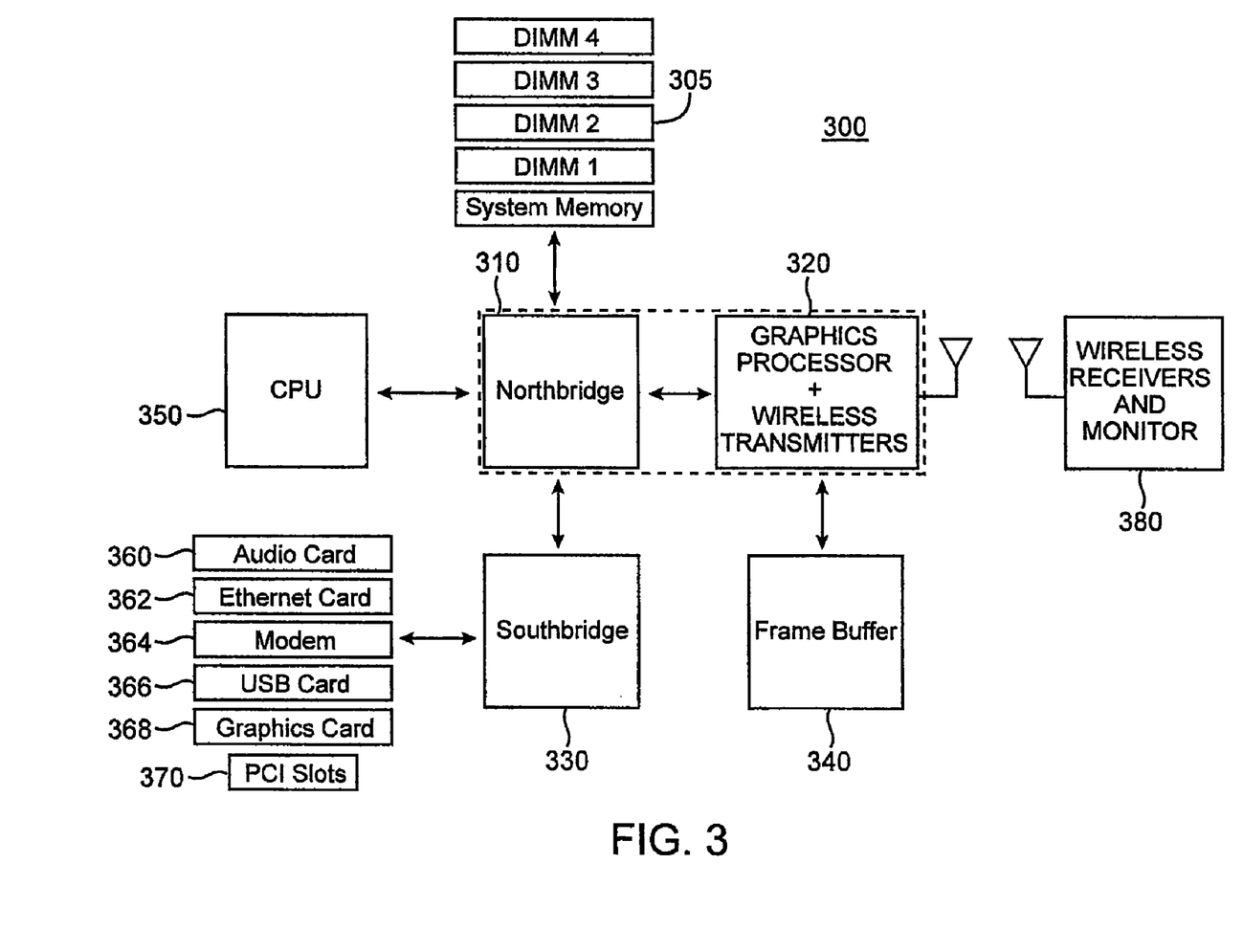
FIG. 3 is a block diagram of a conventional computing system incorporating an embodiment of the present invention.

FIG. 3 is a block diagram of a conventional computing system 300 incorporating an embodiment of the present invention. This computing system 300 includes a Northbridge 310, graphics processing unit 120 including two or more wireless transmitters or transceivers (not shown), Southbridge 330, graphics memory or frame buffer 340, central processing unit (CPU) 350, audio card 360, Ethernet card 362, modem 364, USB card 366, graphics card 368, PCI slots 370, memories 205, and monitor 380 including two or more wireless receivers or transceivers. This figure, as with all the included figures, is shown for illustrative purposes only, and does not limit either the possible embodiments of the present invention or the claims.

The Northbridge 310 passes information from the CPU 350 to and from the memories 305, graphics accelerator 320, and Southbridge 330. Southbridge 330 interfaces to external communication systems through connections such as the universal serial bus (USB) card 366 and Ethernet card 362. The graphics accelerator 320 receives graphics information over the accelerated graphics port (AGP) bus 325 through the Northbridge 310 from CPU 350 and directly from memory or frame buffer 340. The graphics processor 320 interfaces with the frame buffer 340. Frame buffer 340 may include a display buffer that stores pixels to be displayed.

The graphics processor 320 receives graphics information, processes it, and sends it wirelessly to the monitor 380. In order to achieve a high bandwidth that allows for the transmission of quality video signals, the graphics processor 320 incorporates multiple transmitters that send data in parallel to monitor 380. Similarly, the monitor 380 includes multiple wireless receivers that receive multiple data signals in parallel from the graphics processor 320.

In this architecture, CPU 350 performs the bulk of the processing tasks required by this computing system. In particular, the graphics processor 320 relies on the CPU 350 to set up calculations and compute geometry values. Also, the audio or sound card 360 relies on the CPU 350 to process audio data, positional computations, and various effects, such as chorus, reverb, obstruction, occlusion, and the like, all simultaneously. Moreover, the CPU 350 remains responsible for other instructions related to applications that may be running, as well as for the control of the various peripheral devices connected to the Southbridge 330.

Figure 4:
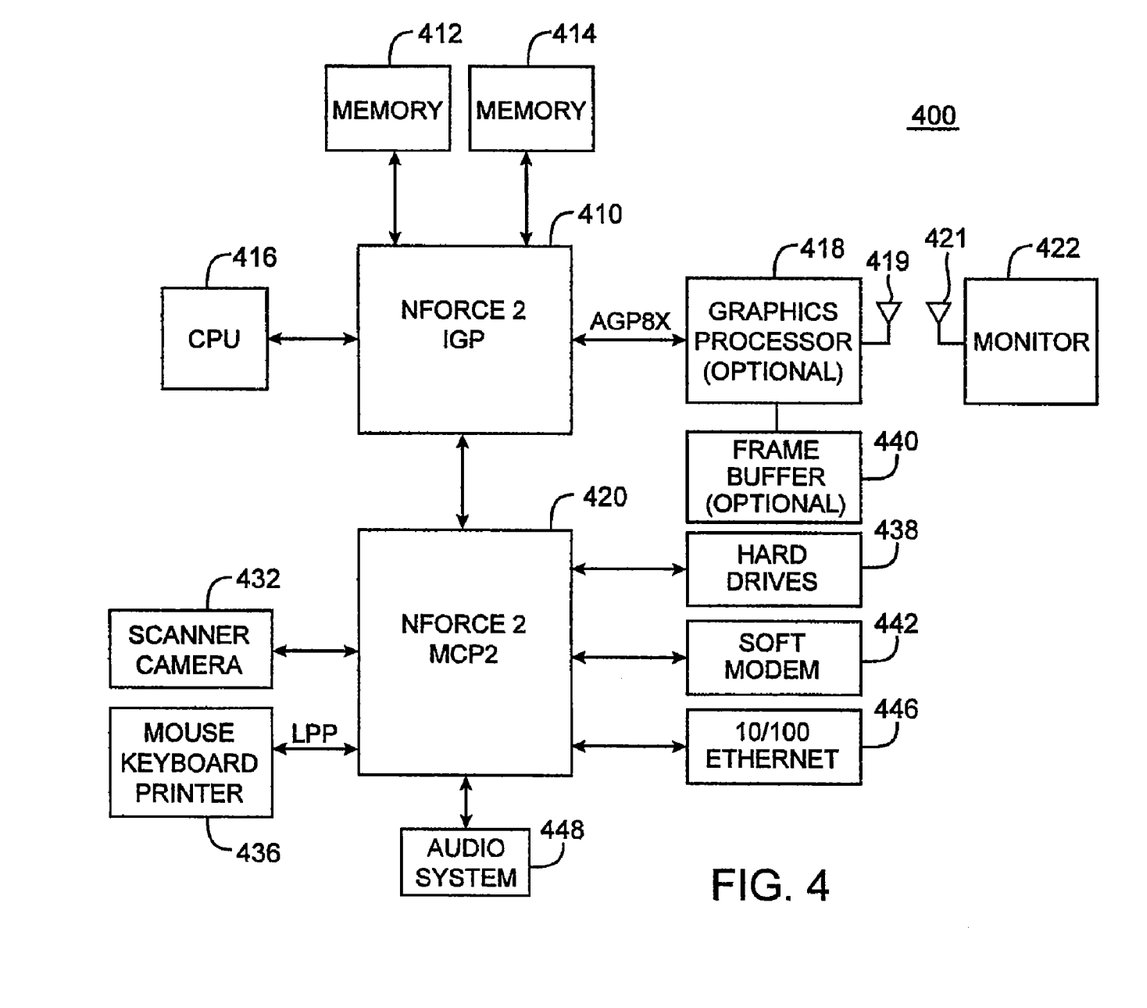
FIG. 4 is a block diagram of an improved computing system incorporating an embodiment of the present invention.

FIG. 4 is a block diagram of an improved computing system incorporating an embodiment of the present invention. The improved computer system 400 includes an integrated graphics processor circuit 410 such as the NVIDIA nForce™2 integrated graphics processor (IGP), an nForce2 media communications processor (MCP2) 420, memory 412 and 414, CPU 416, optional graphics processor 418 and frame buffer 440, monitor 422, scanner or camera 434, mouse, keyboard, and printer 436, hard drives 438, soft modem 442, Ethernet network or LAN 446, and audio system 448.

This revolutionary system architecture has been designed around a distributed processing platform, which frees up the CPU to perform tasks best suited to it. Specifically, the nForce2 IGP 410 includes a graphics processing unit (GPU) (not shown) which is able to perform graphics computations previously left to the CPU 416. Alternately, the nForce2 IGP 410 may interface to an optional GPU 418 which performs these computations. Also, nForce2 MCP2 420 includes an audio processing unit (APU), which is capable of performing many of the audio computations previously done by the CPU 416. In this way, the CPU is free to perform its tasks more efficiently. Also, by incorporating a suite of networking and communications technologies such as USB and Ethernet, the nForce2 MCP2 420 is able to perform much of the communication tasks that were previously the responsibility of the CPU 416.

In this architecture, the nForce2 IGP 410 communicates with memories 412 and 414 over buses 413 and 415. The nForce2 IGP 410 also interfaces to an optional graphics processor 418 over an advanced AGP bus 417. In various computer systems, optional processor 418 may be removed, and the monitor 422 may be wirelessly driven by the nForce2 IGP 410. In other systems, there may be more than one monitor 422, some or all of which receive wireless signals from optional graphics processor 418 or the nForce2 IGP 410. The nForce2 IGP 410 communicates with the nForce2 MCP2 420 over a HyperTransport™ link 421. The optional graphics processor 418 may also interface with external memory, such as the optional frame buffer 440.

The nForce2 MCP2 420 contains controllers for Ethernet connections 446 and soft modem 442. The nForce2 MCP 420 also includes interfaces for a mouse, keyboard, and printer 436, and USB ports for cameras and scanners 434 and hard drives 438.

This arrangement allows the CPU 416, the nForce2 IGP 410, and the nForce2 MCP2 420, to perform processing independently, concurrently, and in a parallel fashion.

Embodiments of the present invention may be used improve the wireless bandwidth between a graphics processing unit such as the graphics processing unit the nForce2 IGP 410 or the graphics processor 418 and the monitor 422.

Figure 5:
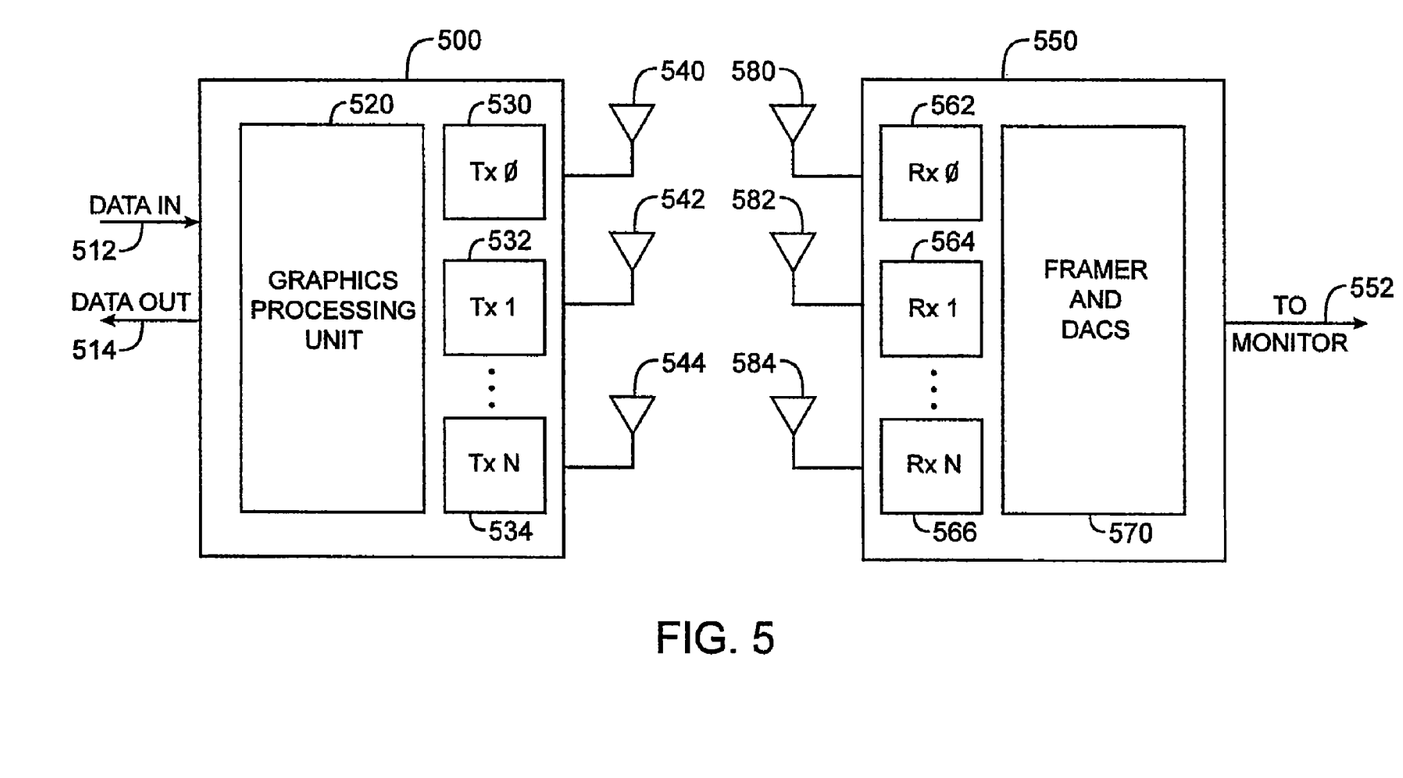
FIG. 5 is a block diagram of another wireless graphics system according to an embodiment of the present invention.

FIG. 5 is a block diagram of another wireless graphics system according to an embodiment of the present invention. This block diagram includes a first integrated circuit 500 and a second integrated circuit 550. The first integrated circuit includes a graphics processing unit 510, and a number of transmitters 530, 532, and 534. Graphics information is received and provided on lines 512 and 514, which typically connect to a CPU, computer, or other computing subsystem. The received graphics information is processed by the graphics processing unit. The processed graphics information is divided or partitioned into portions, each of which are provided to one of the transmitters 530, 532, and 534. These transmitters send their respective data portions as RF signals using antennas 540, 542, and 544. These antennas may be one shared antenna or they may be separate antennas as drawn. Typically, constraints such as chip and board layout considerations and impedance matching dictate the number of antennas used.

The second integrated circuit includes a number of receivers 562, 564, and 566, as well as output circuitry including a framer and DACs 570. The wireless signals are received on antennas 580, 582, and 584 and provided to receivers 562, 564, and 566. Again, these may be one shared antenna or multiple antennas. The receivers demodulate the signals and provide them to the framer and DAC circuitry 570. This circuitry reassembles the data to form a graphic image and provides a signal on lines 552 to the monitor (not shown). In various embodiments of the present invention, this signal may be an analog or a digital signal.

In various embodiments of the present invention, the signals transmitted and received by the circuitry shown in this and the other figures may be compliant with a RF standard or protocol such as IEEE 802.11a, IEEE 802.11b, IEEE 802.11g, Bluetooth, Ultra Wideband Wireless (UWB), wireless USB, or other currently existing or later developed wireless standard or protocol. Alternately, a proprietary or other signaling scheme may be used. Each of the transmitters may use the same protocol or signaling scheme, or a variety of protocols or signaling schemes may be used. If the same protocol is used for each transmitter and corresponding receiver, a schemes whereby the transmitters use frequencies in a manner in which collisions are avoided may be used. Such a scheme may be referred to as a smart frequency-hopping scheme.

In this and the other included figures, wireless transmitters or transceivers are shown as being formed on the same integrated circuit as the graphics processing unit. This integrated circuit is typically on a motherboard, a daughterboard, or an add-on or other video card in a computing system. In other embodiments of the present invention, the graphics processing unit and wireless transmitters may be formed on separate circuits. For example, the graphics processing unit may be located on a first integrated circuit while the wireless circuits may be on a second integrated circuit. Alternately, the wireless circuits may be formed on more than one separate integrated circuit, each separate integrated circuit including one or more transmitters or transceivers. In this configuration, the integrated circuit including the graphics processing unit typically is located on the motherboard, daughterboard, add-on, or other video card. In various embodiments of the present invention, the wireless circuit or circuits may be located on the motherboard, daughterboard, add-on, or other card, such as a PC card (previously PCMCIA card). This may be the same as the graphics processing unit's location, or it may be separate from the graphics processing unit. A PC card implementation, either with the wireless circuits alone or with a graphics processing unit, is particularly advantageous in a computing system where a lap-top computer generates a video image for a monitor or other display apparatus.

In some computer systems it is desirable for one graphics processing unit to provide graphics signals to more than one monitor. In some circumstances, one graphics signal may be provided to multiple monitors, while in other circumstances, each monitor may receive a unique signal.

Figure 6:
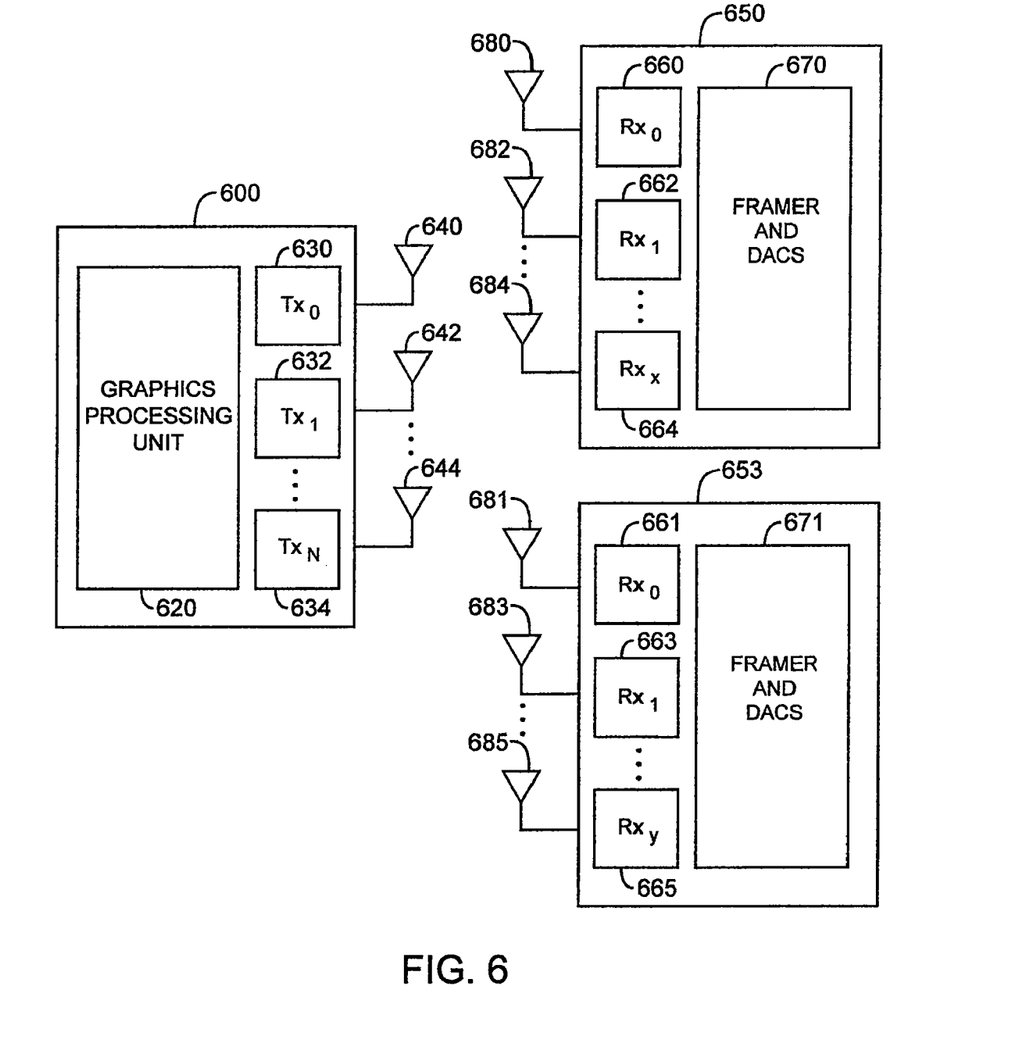
FIG. 6 is a block diagram of another wireless graphics system including multiple monitors according to an embodiment of the present invention.

FIG. 6 is a block diagram of another wireless graphics system including multiple monitors according to an embodiment of the present invention. This block diagram includes three integrated circuits 600, 650, and 653. Integrated circuit 600 includes a graphics processing unit 620 and a number of transmitters 630, 632, and 634. As before, graphics processing unit 620 generates processed graphics information and partitions it and provides each portion to one of the transmitters 630, 632, and 634. These transmitters in turn convert this information by multiplying it with a carrier signal and applying it to the antennas 640, 642, and 644. Again, these antennas may be one shared antenna or multiple antennas.

The second integrated circuit 650 includes a number receivers 660, 662, and 664. The signals are received on antennas 680, 682, and 684 and are provided to the receivers 660, 662, and 664. Again, the antennas may be one shared or multiple antennas. The receivers 660, 662, and 664 demodulate the signals and provide them to the framer and DAC circuitry 670. The framer circuitry reassembles the graphic image and provides it to a first monitor (not shown).

The third integrated circuit 653 includes receivers 651, 663, and 665, and framer and DAC circuitry 671. The signals are received on antennas 681, 683, and 685 by the receiver circuitry 661, 663, and 665. The receiver circuits 661, 663, and 665 demodulate the received signals and provide the demodulate data to the framer and DACs 671. The framer and DACs 671 reassemble the graphic image and provide it to a second monitor (not shown).

Again, the second and third integrated circuits 650 and 653 may receive unique signals. In this case, the number of active transmitters on integrated circuit 600 typically equal the sum of the numbers of active receivers on integrated circuits 650 and 653. The number of active receivers on integrated circuit 650 and 653 may be equal or they may be different from each other. For example, if integrated circuit 650 is providing a signal for a higher resolution monitor than the third integrated circuit 653, more receivers on the second integrated circuit

650 should be active than on the third integrated circuit 653. To support this, more of the transmitters on integrated circuit 600 should provide signals for the second integrated circuit 650 than the third integrated circuit 653. In this way, the wireless bandwidth and data transfer rate to the second integrated circuit is increased in order to maintain image quality on its higher resolution monitor. An example of this is where one monitor is receiving a conventional television image, while the other is receiving a high-resolution videogame image. Similarly, if the resolution of one of the monitors is changed, the number of active receivers and corresponding transmitters may be varied accordingly.

Conversely, both the first and second monitors may receive the same image. In this case, typically the number of active transmitters on the first integrated circuit is equal to the number of active receivers on the second and third integrated circuit 650 and 653. Again, as the resolution of one or both of the monitors is changed, the number of active transmitters and receivers may be changed, for example to save power in a mobile application.

In the above examples, the wireless circuitry associated with the graphics processing units have been transmitters. This has been to illustrate the flow of the graphics information from the graphics processing units to the monitors. In some embodiments of the present invention, transceivers are used. This allows two-way communication of data, specifically data may flow from the GPU to the monitor and from the monitor back to the GPU and related circuits. This two-way data may include graphics and status information.

Figure 7:
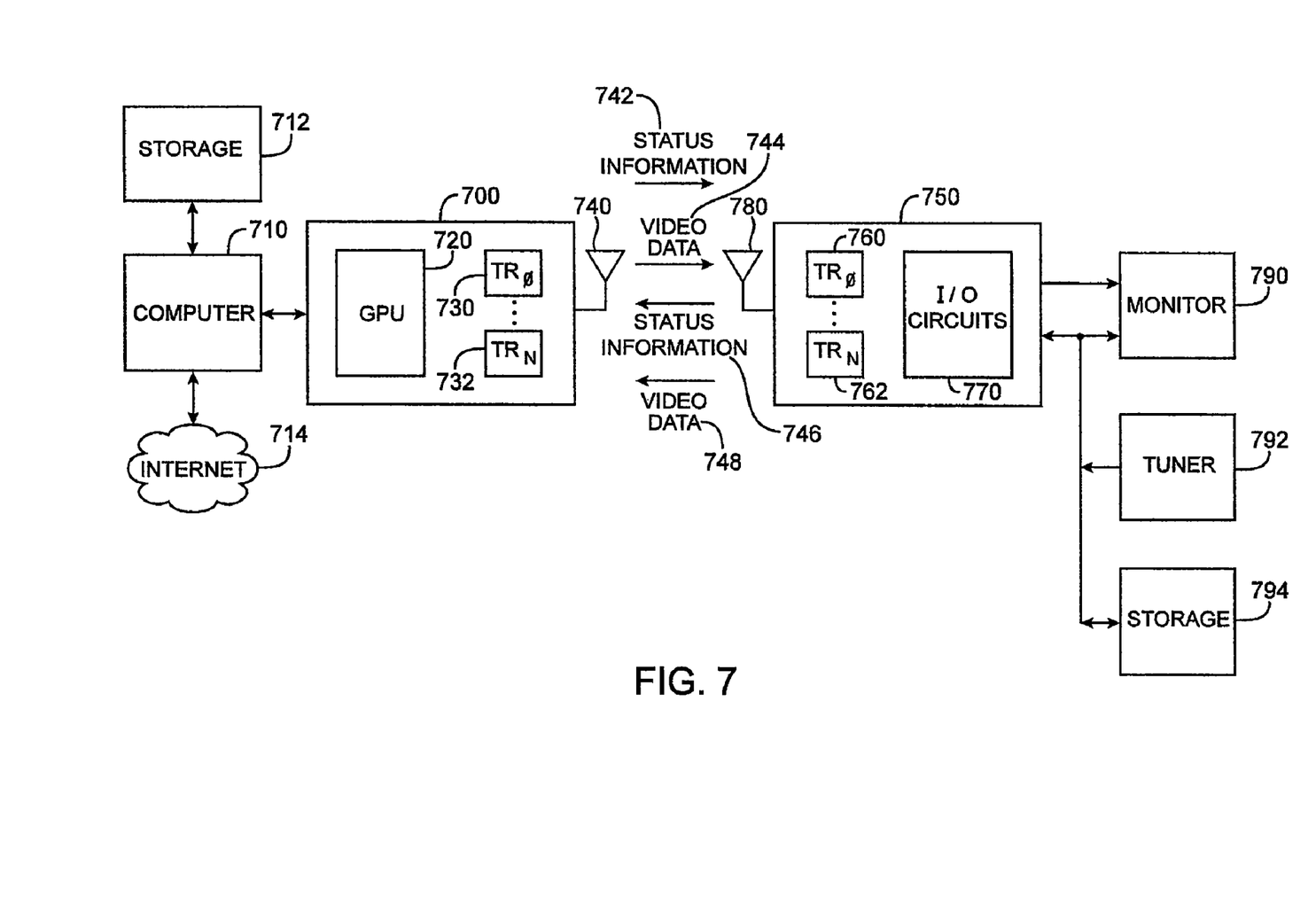
FIG. 7 is a block diagram illustrating graphics information and status information transfers in a system according to an embodiment of the present invention.

FIG. 7 is a block diagram illustrating graphics and status information transfers in a system according to an embodiment of the present invention. Included are a first integrated circuit 700 and a second integrated circuit 750. The first integrated circuit includes a graphics processing unit 720 and a number of transceivers 730 and 732. The second integrated circuit includes a number of transceivers 760 and 762 and input/output circuit 770. Status information 742 and graphics information 744 are provided from the first integrated circuit 700 to the second integrated circuit 750. Similarly, status information 746 and graphics information are provided from the second integrated circuit 750 to the first integrated circuit 700.

Specifically, the first integrated circuit 700 may send status information 742 including monitor resolution and refresh rate to the monitor 790 through the second integrated circuit 750. Similarly, the graphics processing unit 720 generates graphics images for transmission and display on monitor 790.

The monitor 790 may report status information 746 such as a signal strength indication. For example, if the monitor 790 receives a weak signal, power may be increased to the transmitters in transceivers 730 and 732. Alternately, the resolution or refresh rate of monitor 790 may be decreased to reflect the reduction in bandwidth and transmit data rate due to poor reception.

The monitor 790 may also be a monitor such as a television and a living room. In this event, it is likely to be connected to a television tuner 792 and storage device 794, such as a DVD or VCR player. These devices in turn may provide signals to the monitor 790 and back through the second integrated circuit 750 to the first integrated circuit 700. The first integrated circuit 710 in turn may pass these images on to the computer 710. The computer 710 may have connections to the Internet 714 or storage devices 712, such as DVD, hard drives, or other storage or memory devices.

In some embodiments where a graphics image path from the second 750 to the first integrated circuit 700 is not needed, several transmitters may be included on the first integrated circuit 700, while only one receiver may be included to receive signal strength indications or other information. Similarly, only one transmitter may be included in the second integrated circuit 750 in this case.

In this and the other included figures, video information is transmitted from one circuit to another. In various embodiments of the present invention, audio information is also sent from one circuit to another. The audio information may be included as part of the video information. That is, each transmitter or transceiver on an integrated circuit, such as the integrated circuit 700, may handle part of the video transmission and part of the audio transmission. Alternately, one or more transmitters or transceivers may transmit the audio information, while others transmit the video information. In other embodiments, audio and status information may be sent using one or more transmitters or transceivers, while other transmitters or transceivers share the task of transmitting video information.

In some systems, it is desirable to have multiple graphics processing units providing images to a single monitor. For example, it may be desirable while working on a Word document to have a corner of the monitor screen devoted to the game. Also in some circumstances, it may be desirable for a single graphics processing unit to provide signals to two or more monitors. In this case, both monitors may be wireless, as shown in FIG. 6, or one may be wireless while the other is connected through a cable or other conductor.

Figure 8:
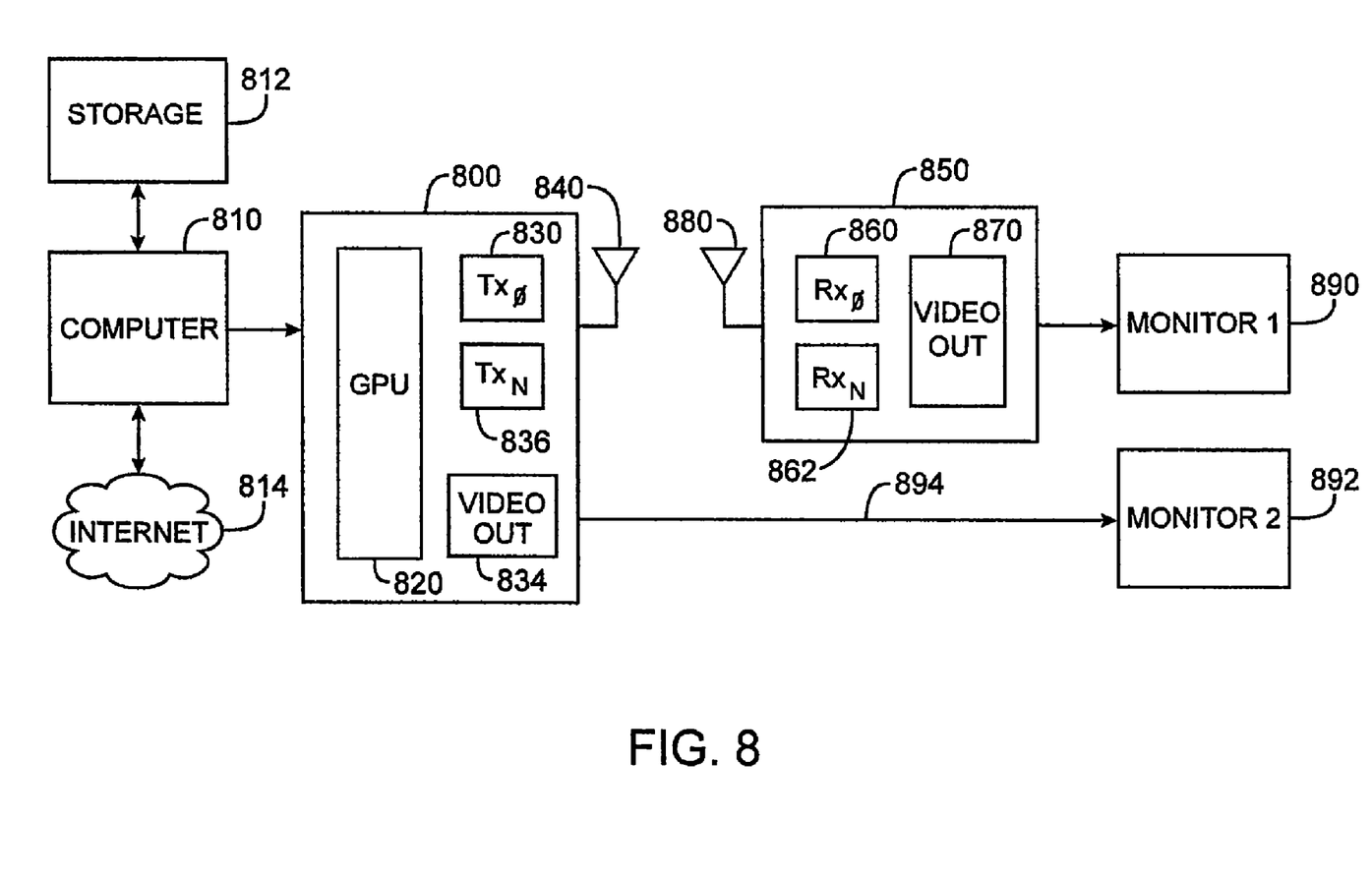
FIG. 8 is a block diagram illustrating a system wherein one computing system provides video content for two monitors according to an embodiment of the present invention.

FIG. 8 is a block diagram illustrating a system wherein one computing system provides video content for two monitors according to an embodiment of the present invention. Included are a first integrated circuit 800 and a second integrated circuit 850. The first integrated circuit 800 includes a graphics processing unit 820 and a number of wireless transmitters 830 and 832. The first integrated circuit 800 also includes a conventional video out circuit 832.

The second integrated circuit 850 includes a number of receivers 860 and 862 and a video output circuit 870. The second integrated circuit 850 provides a video output signal to the first monitor 890, while the video output circuit on the first integrated circuit 800 provides a signal on conductor 894 to the second monitor 892.

The GPU 820 receives graphics information from the computer 810. The computer 810 may be connected to the Internet 814, to storage devices 812, or other video circuitry. The storage device 812 may be a DVD read/write drive, hard drive, or other peripheral device.

This particular configuration is particularly useful where the image displayed on monitor 892 is comparatively high-resolution, while the image displayed on monitor 890 is comparatively low resolution.

In various embodiment of the present invention, it is desirable to divide the graphics processing workload between two or more graphics processing units. The workload may be split between (or among) processors in a variety of ways. For example, two graphics processing units may render alternating frames of an image to be displayed. This is particularly useful in 3-dimensional applications. Also, two or more graphics processing units may divide an image to be displayed on a per-frame basis, for example with a first graphics processing unit rendering the top portion of an image and a second graphics processing unit rendering the bottom portion of an image.

Figure 9:
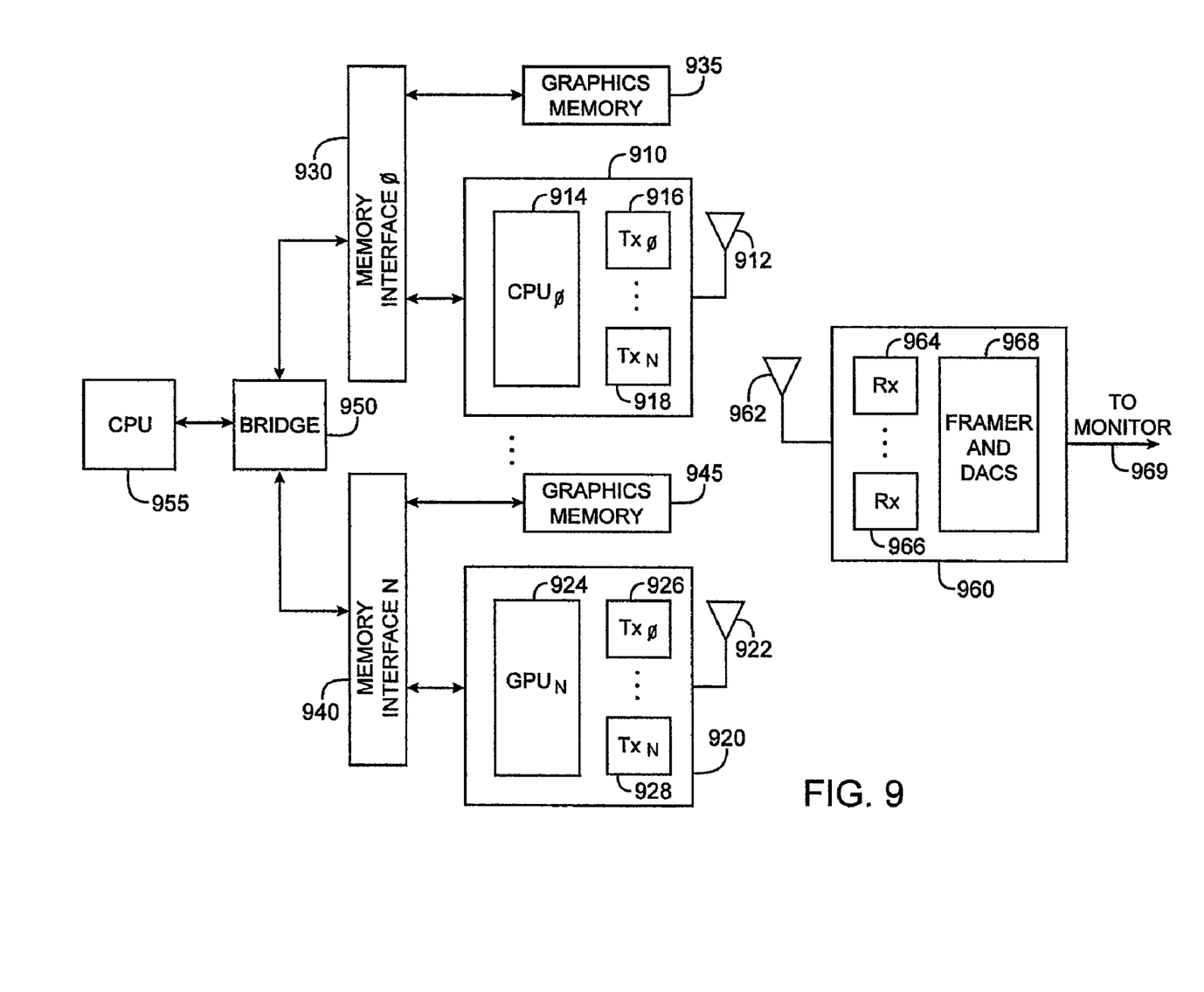
FIG. 9 is a block diagram of a wireless graphics system including multiple graphics processing units.

FIG. 9 is a block diagram of a wireless graphics system including multiple graphics processing units. This block diagram includes a first integrated circuit 910 including a first graphics processing unit 914, a second integrated circuit 920 including a second graphics processing unit 924, a third integrated circuit 916, a bridge 950, and a CPU 955. More than two integrated circuits that include a graphics processing unit may be used in various embodiments of the present invention.

The CPU 955 communicates with the graphics processing units 914 through 924 via the bridge 950. The bridge 950 in turn communicates with the graphics processing units 914 through 924 via the memory interface circuits 930 through 940. The graphics processing units 914 through 924 render their respective portions of an image or video stream to be displayed. Graphics processing unit 914 stores and retrieves data from graphics memory 935 via the memory interface 930. Similarly, the graphics processing unit 924 stores and retrieves data from graphics memory 945 via the memory interface 940.

The graphics processing unit 914 transmits its portion of the image to be displayed via transmitters 916 through 918. The graphics processing unit 924 transmits its portion of the image to be displayed via transmitters 926 through 928. As in this and the other figures, this activity may be performed by a scanout engine that may be considered part of the graphics processing unit itself, or as a separate circuit that is not shown for simplicity.

In other embodiments, the graphics processing units 914 through 924 may connected to a single scanout circuit that in turn couples to a number of transmitters or transceivers. In this configuration, the graphics processing units, scanout engine, and transmitters or transceivers may be included on a single integrated circuit. Alternately, a first graphics processing unit may be formed on a first integrated circuit while a second graphics processing unit may share an integrated circuit with one or more transmitters or transceivers.

The transmitters or transceivers 916 through 918 communicate using antenna 912, while transmitters or transceivers 926 through 928 communicate using antenna 922. As before, these antennas may be one or more individual antennas.

The third integrated circuit 960 receives signals via antenna 962. The signals are received by receivers 964 and through 966. The receivers 964 and 966 in turn pass the signals to the framer and DACs 968, which provide a signal to a monitor 969 (not shown).

It will be appreciated that modifications to this circuit may be made. For example, the bridge circuit 950 may be eliminated, or its function may be included in one or both of the graphics processor integrated circuits 910 and 920. For example, the output of one GPU may be fed-back through the first GPU. Examples of this may be found in co-pending U.S. patent application Ser. No. 11/015,600, filed Dec. 16, 2004, titled COHERENCE OF DISPLAYED IMAGES FOR SPLIT-FRAME RENDERING IN MULTI-PROCESSOR GRAPHICS SYSTEM.

In this example, wireless circuits are shown on both the integrated circuits 910 and 920. In other embodiments, wireless circuits may be on only one of the integrated circuits. Alternately, the wireless circuits may be elsewhere in a computing or other system, for example on a separate integrated circuit on an add-on card, motherboard, or other location.

Figure 10:
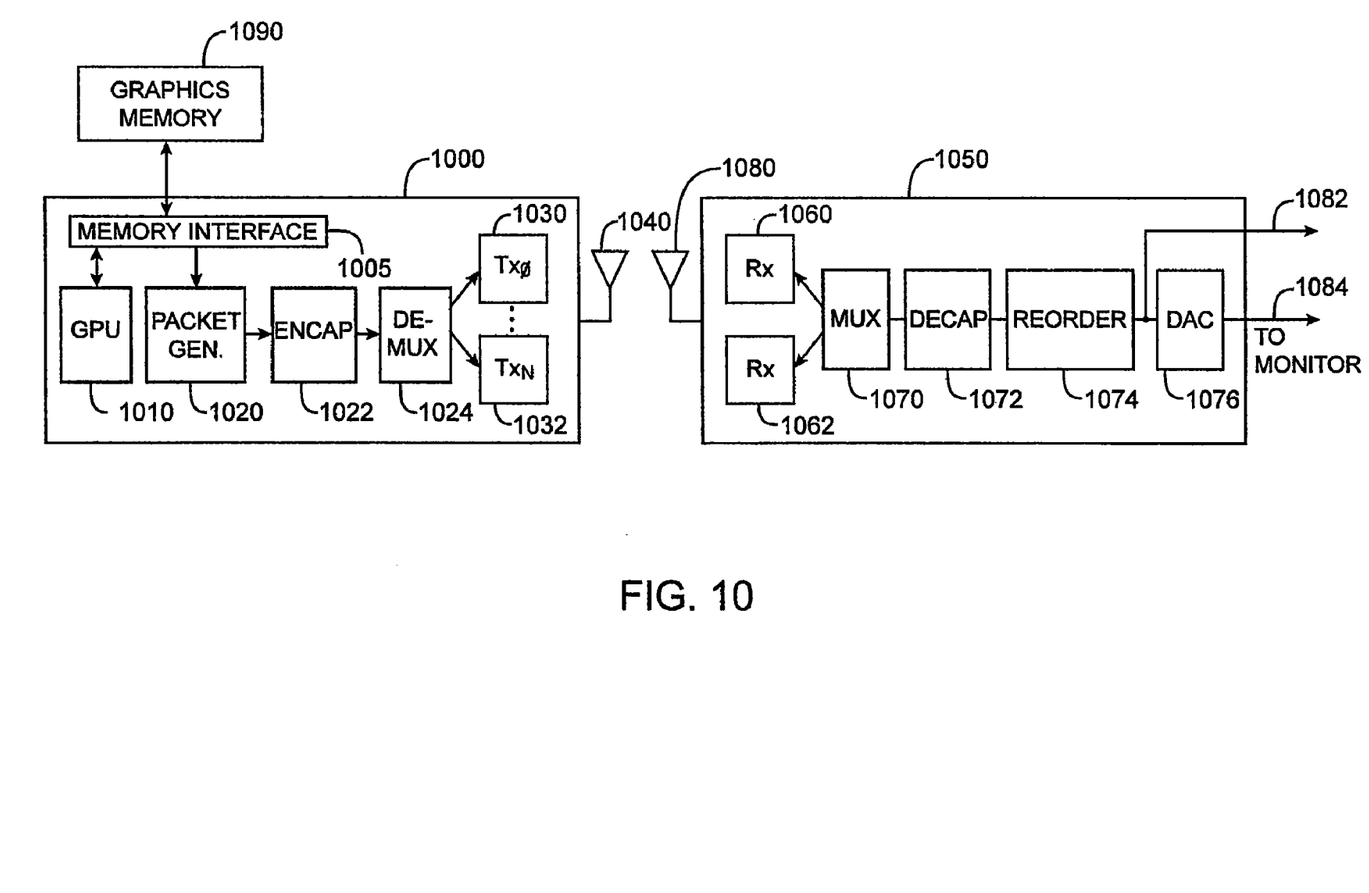
FIG. 10 is a more detailed block diagram of two integrated circuits that may be used in wireless video systems according to an embodiment of the present invention.

FIG. 10 is a more detailed block diagram of two integrated circuits that may be used in wireless video systems according to an embodiment of the present invention. This block diagram includes a first integrated circuit 1000 and a second integrated circuit 1050, as well as a graphics memory 1090. The graphics memory 1090 may typically be one or more DRAM devices. The graphics processing unit 1010 generates a graphics image for display and stores it in the graphics memory 1090 via the memory interface 1005. The memory interface 1005 provides the graphic image to packet generator 1020. The packet generator 1020 generates packets, each containing a portion of the graphic image. These are passed to the encapsulator 1020, which provides header and the location ID information. These encapsulated packets are then demultiplexed by the multiplexer 1024 and provided to the transmitters 1030 and 1032. These transmitters provide the encapsulated packets as RF signals using antenna or antennas 1040. The signals are received by the second integrated circuit 1050 via antenna or antennas 1080.

The second integrated circuit receives the RF signals with receivers 1060 and 1062. These receivers demodulate the signals and provide them to multiplexer circuit 1070. The multiplexer 1070 serializes the data and provides it to de-encapsulator 1072. These packets are then reordered by reorder circuit 1074. The graphic images are then provided either as digital information on line 1092, or as a converted analog signal on line 1084 by an output circuit (not shown separately for clarity).

These circuits may also include one or more encoding or encryption schemes. Also, compression schemes may be used to limit the amount or graphic information that needs to be wirelessly transmitted. These schemes may be varied depending whether a conductor or wireless path is used. When a wireless path is used, these schemes may be adjusted depending on reception strength, screen resolution and refresh rate, as well as other factors.

The above description of exemplary embodiments of the invention has been presented for the purposes of illustration and description. It is not intended to be exhaustive or to limit the invention to the precise form described, and many modifications and variations are possible in light of the teaching above.

For example, while specific figures may include a number of monitors or processors, such as two, embodiments of the present invention may be used with fewer or more than this number.

Also, while the processors were shown as graphics processors for simplicity, other types of general purpose, specialized, or other types or combinations or processors may be used by various embodiments of the present invention. Also, embodiments of the present invention may use one antenna per transmitter and receiver, while others may share antennas between two or more transmitters or receivers. This may depend on the exact circuitry used, layout, termination, and other considerations.

The embodiments were chosen and described in order to best explain the principles of the invention and its practical applications to thereby enable others skilled in the art to best utilize the invention in various embodiments and with various modifications as are suited to the particular use contemplated.

What is claimed is:

1. An integrated circuit comprising:
 a graphics processing unit coupled to a graphics memory interface;
 a packet generator circuit coupled to the graphics memory interface;
 an encapsulator coupled to the packet generator;
 a demultiplexer coupled to the encapsulator;
 a first wireless transmitter coupled to the demultiplexer; and
 a second wireless transmitter coupled to the demultiplexer.

2. An integrated circuit comprising:
 a first wireless receiver;
 a second wireless receiver;
 an output circuit,
 a multiplexer coupled to the first wireless receiver and the second wireless receiver; and a decapsulator circuit and a reorder circuit coupled between the multiplexer and the output circuit;

wherein the output circuit is configured to provide a signal to a monitor.

3. The integrated circuit of claim 1 wherein the first wireless transmitter is compliant with an RF standard.

4. The integrated circuit of claim 3 wherein the RF standard is one of the group consisting of IEEE 802.11a, IEEE 802.11b, IEEE 802.11g, Bluetooth, or Ultra Wideband Wireless.

5. The integrated circuit of claim 1 wherein the first wireless transmitter modulates graphics information with an RF carrier according to an RF standard.

6. The integrated circuit of claim 1 wherein the packet generator circuit generates a plurality of packets, each containing a portion of a graphics image.

7. The integrated circuit of claim 1 wherein the encapsulator provides header and location ID information.

8. The integrated circuit of claim 1 wherein the graphics processing unit scrambles graphics information.

9. The integrated circuit of claim 1 wherein the graphics processing unit receives graphics information from a CPU.

10. The integrated circuit of claim 1 wherein the first and second wireless transmitters are configured to transmit first status information and first graphics information.

11. The integrated circuit of claim 10 wherein the first and second wireless transmitters are further configured to receive second status information and second graphics information.

12. The integrated circuit of claim 11 wherein the first status information comprises screen resolution settings and an indication of a number of transmitters used by the integrated circuit, wherein the second status information comprises an indication of a received signal strength.

13. The integrated circuit of claim 2 wherein the first wireless receiver is compliant with an RF standard.

14. The integrated circuit of claim 13 wherein the RF standard is one of the group consisting of IEEE 802.11a, IEEE 802.11b, IEEE 802.11g, Bluetooth, or Ultra Wideband Wireless.

15. The integrated circuit of claim 1 wherein the graphics memory interface is configured to store and retrieve data to and from a DRAM, and the graphics processing unit is configured to receive graphics information from a CPU.

16. The integrated circuit of claim 2 wherein the multiplexer serializes received data packets.

17. The integrated circuit of claim 16 wherein the decapsulator removes header information.

18. The integrated circuit of claim 17 wherein the reorder circuit reorders packets provided by the decapsulator.

19. The integrated circuit of claim 2 wherein the output circuit comprises a digital-to-analog converter.

20. The integrated circuit of claim 19 wherein the integrated circuit provides an analog output and a digital output.

* * * * *